United States Patent [19]
Phillips et al.

[11] Patent Number: 5,624,646
[45] Date of Patent: Apr. 29, 1997

[54] METHOD FOR IMPROVING THE BRIGHTNESS OF ALUMINUM HYDROXIDE

[75] Inventors: Richard B. Phillips, Little Rock, Ark.; Nancy M. Fitzgerald, Wilkins Township; Bennett L. McCormick, Cheswick, both of Pa.

[73] Assignee: Aluminum Company of America, Pittsburgh, Pa.

[21] Appl. No.: 382,936

[22] Filed: Feb. 2, 1995

Related U.S. Application Data

[63] Continuation-in-part of Ser. No. 136,956, Oct. 14, 1993, abandoned.

[51] Int. Cl.$^6$ .................................. C01F 1/00; C22B 21/00
[52] U.S. Cl. ........................... 423/130; 423/122; 423/121
[58] Field of Search .................................. 423/130, 629, 423/121, 122; 210/670

[56] References Cited

U.S. PATENT DOCUMENTS

| Re. 34,164 | 1/1993 | Misra | 423/115 |
|---|---|---|---|
| 3,649,185 | 3/1972 | Sato et al. | 423/121 |
| 3,879,523 | 4/1975 | Miyata et al. | 423/593 |
| 4,046,855 | 9/1977 | Schepers et al. | 423/130 |
| 4,676,959 | 6/1987 | The et al. | 423/629 |
| 4,752,397 | 6/1988 | Sood | 210/670 |
| 4,915,930 | 4/1990 | Goheen et al. | 423/122 |
| 5,068,095 | 11/1991 | Nigro et al. | 423/122 |

FOREIGN PATENT DOCUMENTS

| 59-102819 | 6/1984 | Japan | 423/629 |
|---|---|---|---|

*Primary Examiner*—Steven Bos
*Attorney, Agent, or Firm*—Gary P. Topolosky; Glenn E. Klepac

[57] ABSTRACT

There is disclosed a method for improving the brightness level of aluminum hydroxide removed from a caustic solution. The method comprises: (a) pre-filtering the solution to remove contaminants therefrom; and (b) contacting the filtered solution with an adsorbent consisting essentially of a calcined compound having the formula: $A_w B_x(OH)_y C_z \cdot n H_2 O$ wherein A represents a divalent metal cation selected from the group consisting of: $Mg^{2+}$, $Ni^{2+}$, $Fe^{2+}$, $Ca_{2+}$ and $Zn^{2+}$; B represents a trivalent metal cation selected from the group consisting of: $Al^{3+}$, $Fe^{3+}$ and $Cu^{3+}$; C represents a mono- to tetravalent anion selected from the group consisting of: $OH^-$, $Cl^-$, $Br^-$, $NO_3^-$, $CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$; and w, x, y, z and n satisfy the following: $0 < z \leq x \leq 4 \leq w \leq \frac{1}{2} y$ and $12 \geq n \geq \frac{1}{2}(w-x)$; and (c) adsorbing additional contaminants onto the calcined compound. On a preferred basis, this method also includes: (d) filtering or sepiating contacted compound and additional contaminants from the solution. Still further preferred method steps include: adding to the filtered solution as seed material an aluminum hydroxide of high brightness, preferably with a whiteness level of about 85% or higher based on a 100% $TiO_2$ reference standard. Preferably, the method further includes: (i) separating calcined compound from the solution; (ii) recalcining the separated compound; and (iii) contacting recalcined compound with additional solution. A preferred adsorbent for step (b) consists essentially of calcined hydrotalcite. There is also provided an improved aluminum hydroxide product having a whiteness level of 85% or higher based on a 100% $TiO_2$ reference standard, said compound having been removed from a caustic solution and decolorized by the foregoing method.

28 Claims, 5 Drawing Sheets

METHOD FOR IMPROVING THE BRIGHTNESS OF ALUMINUM HYDROXIDE

This application is a continuation-in-part application of Ser. No. 08/136,956, Filed Oct. 14, 1993, now abandoned.

BACKGROUND OF THE INVENTION

1. Field of the Invention

This invention relates to the purification of caustic liquors and high caustic streams, especially those relating to the production of aluminum hydroxides (also called alumina trihydrates) and aluminas from bauxite according to the Bayer process (sometimes referred to as Bayer liquor streams). The invention further relates to means for making an intermediate grade aluminum hydroxide/hydrate product in terms of brightness, i.e., having a whiteness level of about 85% or higher, more preferably about 90 or 92% whiteness, based on a 100% $TiO_2$ standard and a target adsorbence level of about 0.20. For purposes of this invention, the terms "brightness" and "whiteness" are used interchangably.

2. Technology Review

The recovery of aluminum hydroxide from bauxite according to the Bayer process is achieved by digesting hydroxide-containing ores with a caustic liquor. A major portion of alumina dissolves in this liquor while most unwanted ore constituents, sometimes called "red mud", remain undissolved. After bauxite is pressure digested with a caustic such as sodium hydroxide, red mud may be removed from this liquor. Aluminum hydroxide is then separated from a liquor of supersaturated sodium aluminate, also known as "green" or "pregnant" liquor, typically by precipitation. During such precipitation, the supersaturated sodium aluminate is cooled and mixed with a slurry of aluminum hydroxide particles acting as seed material, or seed stock, to induce the formation of more aluminum hydroxide. After precipitation, the slurry is pumped through a classifier system where a coarse fraction of crystallized aluminum hydroxide is separated from the liquor. The fine fractions of crystallized (or precipitated) aluminum hydroxide are further classified into two finer fractions called "secondary seed" and "tray seed", the latter being the finest fraction from this classifier system. These secondary and tray seeds are often recycled to a precipitator to act as seed for further aluminum hydroxide precipitation. The resulting spent sodium aluminate may be recycled to a digester for mixing with new (or incoming) bauxite.

Sodium aluminate liquors can also be made by digesting precipitated aluminum hydroxide (primary), secondary seed, tray seed or combinations thereof in a method known as redigestion. Some Bayer plants produce excess seed (generally tray seed) which they may thereafter redigest by recycling to bauxite digesters or through a separate, specially designed digester.

High levels of impurities are undesirable in the sodium aluminate liquor used to make aluminum hydroxide because such impurities decrease the whiteness or color purity of the hydroxide/hydrate precipitated therefrom. It is desirable, therefore, to minimize the presence of such impurities in green sodium aluminate liquors before crystallization takes place. Such impurities typically cause the aluminum hydroxide produced to have a whiteness level of about 75% or less based on a 100% $TiO_2$ standard thus prohibiting their use in many applications where generally higher brightness levels (about 80% or above) are required. The present invention produces aluminum hydroxide having whiteness levels of about 85% or more based on the same 100% $TiO_2$ reference standard. For some embodiments, whiteness levels of about 90 or 92% are achieved consistently.

When organic and inorganic impurities are present, lower liquor productivity and reduced alumina purity result. Organic impurities may cause such other complications as: lower alumina yields; excessively fine hydroxide particles; the production of colored liquors and aluminum hydroxide; lower red mud settling rates; caustic losses due to sodium organic formation; an increase in liquor density; increased viscosities; higher boiling points; and unwanted liquor foaming.

Numerous methods are known for removing colorants from a sodium aluminate liquor. These include Australian Patent No. 12085/83 which teaches treating liquors with reactive MgO or $Mg(OH)_2$ before calcining at 900° C. or more. Schepers et al. U.S. Pat. No. 4,046,855 also discloses treating aluminate liquors with a magnesium compound to remove organic colorants therefrom. Japanese Patent No. 57-31527 produces an aluminum hydroxide of high purity by adding one or more alkaline earth metal compounds to such solutions. Representative additives include oxides, hydroxides, carbonates, silicates and nitrates of magnesium or calcium; and barium carbonates, silicates, nitrates or sulfates.

German Patent No. 3,501,350 discloses adding a mixture of calcium oxide/hydroxide and kierserite ($MgSO_4.H_2O$) to Bayer liquors for lowering impurity levels, especially iron contents. In Goheen et al. U.S. Pat. No. 4,915,930, an aluminum hydroxide of improved whiteness is produced by contacting liquor streams with a mixture of tricalcium aluminate and unactivated hydrotalcite. Finally, in Nigro U.S. Pat. No. 5,068,095, caustic solutions, are treated with calcined hydrotalcite to remove colorants, especially iron. High dosages of about 10 g/l were preferred to make hydroxides/hydrates with about 80% whiteness levels or higher. The present invention represents an improvement over the aforementioned Nigro et al. method.

SUMMARY OF THE INVENTION

It is a principal objective of this invention to provide uncomplicated means for removing ionic colorants and contaminants from caustics including sodium hydroxide and sodium aluminate. It is another objective to provide means for improving the whiteness/brightness levels of aluminum hydroxide with reduced product loss. It is still another objective to provide a low cost, low capital means for removing greater amounts of color contaminants from sodium aluminate liquors. Another objective is to provide means for treating sodium aluminate liquors to produce a powder with whiteness levels consistently over 85% based on a 100% $TiO_2$ standard. Yet another objective is to produce hydrates which are higher in brightness than the roughly 65–75% whiteness levels associated with A-30 alumina hydrate as sold by Alcoa of Australia, while being less expensive to produce than Alcoa's significantly whiter (about 96%) C-31 hydrate.

The majority of brighiness measurements described herein were taken using a Technidyne Bfightimeter Model S-4 maintained annually per Technical Association of Pulp & Paper Industry (or TAPPI) requirements and calibrated with purchased standards. Hydrate color by absorbance was measured on a filtered 13.3% caustic solution of hydrated alumina prepared in a Parr bomb at 140°±5° C. for 2 hours. The solution was protected from exposure to light. Light absorbance values were then measured on a Bausch & Lomb Spectronic 2000 Spectrophotometer at 450 nm in a 10 cm cell as corrected against a blank caustic solution.

It is another principle objective to provide improved chemical grade hydrates with lower insoluble contents for the zeolite, alum and sodium aluminate markets. It is yet another objective to overcome the problems and disadvantages of the prior treatment methods described above.

In accordance with the foregoing objectives, there is provided a method for improving the brightness level of aluminum hydroxide or hydrate removed from a caustic solution, typically of redigested aluminum hydrate, supersaturated sodium aluminate or a Bayer liquor stream. One preferred embodiment of this method comprises: (a) filtering the solution to remove contaminants, typically those which are 50 microns or less in size; (b) contacting this filtered solution with an adsorbent consisting essentially of a calcined compound having the formula $A_wB_x(OH)_yC_z.nH_2O$ wherein A represents a divalent metal cation selected from the group consisting of: $Mg^{2+}$, $Ni^{2+}$, $Fe^{2+}$, $Ca^{2+}$ and $Zn^{2+}$; B represents a trivalent metal cation selected from the group consisting of: $Al^{3+}$, $Fe^{3+}$ and $Cu^{3+}$; C represents a mono- to tetravalent anion selected from the group consisting of: $OH^-$, $Cl^-$, $Br^-$, $NO_3^-$ $CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$; and w, x, y, z and n satisfy the following: $0<z \leq x \leq 4 \leq w \leq \frac{1}{2}$ y and $12 \geq n \geq \frac{1}{2}$ (w-x) followed by (c) adsorbing additional contaminants onto this calcined compound. On a preferred basis, the foregoing method further includes: (d) separating or filtering contacted compound and additional contaminants from the solution after step (c). Yet another preferred step adds to the solution as seed material an aluminum hydroxide of high brightness, preferably about 85% or higher based on a 100% $TiO_2$ reference standard. In some instances, this seed may be a fine classified fraction of the aluminum hydroxide produced during above step (d). Optional method steps include: (i) recalcining contacted compound separated from the solution in step (d); and (ii) contacting this recalcined compound with additional solution thereby recycling said adsorbent for enhanced efficiencies. The adsorbent in step (b) preferably consists essentially of calcined or activated hydrotalcite (sometimes abbreviated as "Activ. HTC" in the accompanying FIGURES and TABLES). This product is delivered to a caustic stream in preferred dosages of 1.0 g/l or less, more preferably about 0.3 g/l or less, even as low as about 0.1 g/l or less, for total treatment times of about 15–30 minutes or less. The invention further provides aluminum hydroxide of improved whiteness, about 85% or higher based on a 100% $TiO_2$ reference standard.

BRIEF DESCRIPTION OF THE DRAWINGS

Further features, objectives and advantages of the present invention will become clearer from the following detailed description of preferred embodiments made with reference to the drawings in which.

DETAILED DESCRIPTION OF PREFERRED EMBODIMENTS

Figure 1A:
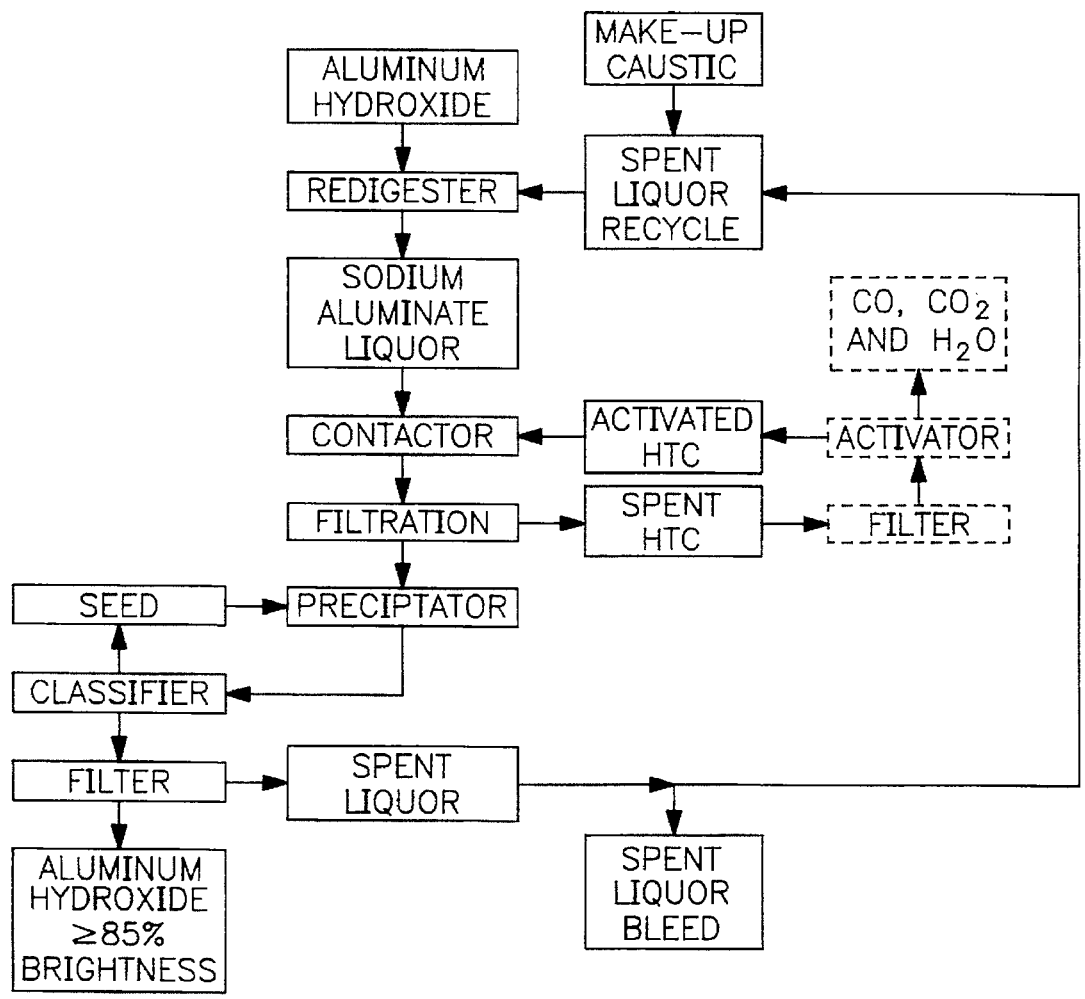
FIG. 1a is a flow chart depicting one embodiment for making improved aluminum hydroxide according to the invention, said embodiment including contacting sodium aluminate liquor with an activated hydrotalcite adsorbent prior to filtration (the optional steps of this embodiment being depicted in dashed boxes)

In this description of preferred embodiments, repeated reference is made to the treatment of sodium aluminate liquors using filtration steps before and/or after contact with sufficient amounts of calcined or activated hydrotalcite. The invention should be understood to apply to still other caustic streams, however, including NaOH and the liquor solutions known to result from certain paper processing techniques. While activated hydrotalcite is the preferred adsorbent used in combination with filtering, the invention may employ still other metal hydroxides belonging to the structural family having the formula: $A_wB_x(OH)_yC_z.nH_2O$, wherein A represents a divalent metal cation, B a trivalent metal cation, C a mono-to tetravelent anion, and w, x, y, z and n satisfy the following: $0<z \leq x \leq 4 \leq w \leq \frac{1}{2}$ y and $12 \leq n \leq \frac{1}{2}$ (w-x). Preferred members of this family have often been identified by the formula: $A_6B_2(OH)_{16}C_z.4H_2O$, wherein A is: $Mg^{2+}$, $Ni^{2+}$, $Fe^{2+}$, $Ca^{2+}$ and/or $Zn^{2+}$; B is: $Al^{3+}$, $Fe^{3+}$ and/or $Cr^{3+}$; and C is one or more anions selected from the list which includes: $OH^-$, $Cl^-$, $Br^-$, $NO_3^-$, $CH_3COO^-$, $C_2O_4^{2-}$, $CO_3^{2-}$, $SO_4^{2-}$, $PO_4^{3-}$, $Fe(CN)_6^{3-}$, and $Fe(CN)_6^{4-}$ with $\frac{1}{2} \leq z \leq 2$ depending on the anionic charge being substituted. Some publications collectively describe many of these foregoing compounds as hydrotalcites. For purposes of this invention, though, such compounds have been divided into various subgroups depending on the divalent and trivalent cations within their alternating brucite-like layers. For example, pyroaurites (or "sjogrenites") have the basic formula: $Mg_6Fe_2OH_{16}CO_3.4H_2O$. Takovites, on the other hand, include compounds resembling: $Ni_6Al_2OH_{16}CO_3.4H_2O$.

Another definition for the term "hydrotalcite" includes any natural or synthetic compound satisfying the formula: $Mg_6Al_2OH_{16}CO_3.4H_2O$. This is sometimes rewritten as $6MgO.Al_2O_3.CO_2.12H_2O$. In its ionic form, hydrotalcite appears as: $[Mg_6Al_2(OH)_{16}]^{2+}[CO_3]^{2-}.4H_2O$. The main structural unit for this compound is brucite, or magnesium hydroxide, in an octagonal sheet-like form, with Mg ions positioned between multiple (OH) ions which share a common edge. By substituting trivalent aluminum for some of the magnesium in this structure, sublayers of magnesium and aluminum are created while still maintaining brucite's basic sheet-like structure. To compensate for the charge imbalance from such aluminum ion substitutions, anions (indicated by letter "C" in the foregoing formulae) and water molecules are intercalated to form interlayers of ($C_z.nH_2O$) between such brucite-like layers. The anion with the greatest affinity to combine with water and form hydrotalcite is carbonate ($CO_3^{2-}$).

The spacial distribution of carbonate ions within hydrotalcite can vary depending on how freely $Al^{32+}$ ions substitute from the $Mg^{2+}$ ions therein. Brucite layer spacing also depends on the amount of aluminum substituted into hydrotalcite's basic structure. As aluminum substitution increases, interlayer spacing generally decreases due to an increase in the electrostatic attraction between the positive hydroxide layers and negative interlayers of hydrotalcite. Interlayer thicknesses may vary still further with the size and orientation of those anions substituted for carbonate in the basic structure of hydrotalcite.

Natural deposits of hydrotalcites have been found in Snarum, Norway and the Ural Mountains. Typical occurrences are in the form of serpentines, talc schists, or as a spinel pseudomorph. Like most ores, natural hydrotalcite is virtually impossible to find in a pure state. Natural deposits typically contain one or more other minerals including penninite and muscovite.

Several methods for making synthetic hydrotalcite are known. The more common approaches produce hydrotalcite as a fine powder, in −20 mesh granules, or as ⅛ inch diameter extrudates. In U.S. Pat. No. 3,539,306, an aluminum hydroxide, aluminum-amino acid salt, aluminum alcoholate, water soluble aluminate, aluminum nitrate and/or aluminum sulfate are mixed together with a carbonate ion-containing compound and magnesium component selected from magnesium oxide, magnesium hydroxide or water-soluble magnesium salt in an aqueous medium maintained at a pH of 8 or more. The resulting product is used as a stomach antacid according to that reference. In Misra U.S. Pat. No. Re. 34,164, the disclosure of which is fully incorporated by reference herein, yet another method for synthesizing hydrotalcite is disclosed. The method comprises heating magnesium carbonate and/or magnesium hydroxide to form activated magnesia, then combining the latter with an aqueous solution of aluminate, carbonate and hydroxyl ions.

Another known method for synthesizing hydrotalcite adds dry ice or ammonium carbonate to a magnesium oxide and alpha alumina mixture. Yet another process, described in *The American Mineralogist*, Vol. 52, pp. 1036–1047 (1967), produces hydrotalcite-like materials by titrating $MgCl_2$ and $AlCl_3$ with a carbon dioxide-free NaOH system. The resulting suspension is dialyzed for 30 days at 60° C. to form a hydrated Mg—Al carbonate hydroxide with both hydrotalcite and manasseite properties.

In preferred embodiments of this invention, caustic solutions may be treated by contact with a substance consisting essentially of calcined or activated hydrotalcite. By use of the term "consisting essentially", it is meant that any contacting adsorbent should contain greater than 85 or 90% activated hydrotalcite, and more preferably about 95 to 98%.

In its fully dehydrated state, calcined hydrotalcite is believed to have the formula: $Mg_6Al_2O_8(OH)_2$. When only partially activated or calcined, hydrotalcite contains more water ions. In alternative embodiments, a granular calcined hydrotalcite may be used, said granular form being made by combining hydrotalcite powders with about 10 to 35% of one or more binder materials.

The activation or heat treatment of hydrotalcite to form calcined variants may be carried out in any conventional or newly-developed medium maintained at temperatures between about 400°–650° C. Preferred activation/calcination temperatures, between about 425°–550° or 600° C., generally maximize surface area and pore volumes for this compound.

After thermal activation, a substance having a porous, skeletal structure is produced from which most if not all water and carbonate ions have been expelled. This product has: an average pore diameter of about 55 angstroms; a skeletal (or solid component) density of about 2.9 $g/cm^3$; and total pore volume of about 0.3 $cm^3/g$. The specific surface, areas of hydrotalcite are also known to increase from about 20 $m^2/g$ to between about 50–200 $m^2/g$ (as determined by BET nitrogen adsorption) after such thermal activation.

In a first embodiment of this invention, FIG. 1a, aluminum hydroxide of improved whiteness/brightness is made by contacting a hydroxide-containing solution with a substance consisting essentially of: calcined hydrotalcite, pyroaurite, takovite, or mixtures thereof. Contacted substance is then separated from this solution for preferably recalcining and recycle. Such recalcining and recycle are optional and may not be necessary if adsorbent dosages are low. An aluminum hydroxide seed of high whiteness, 85% or higher, is then used as seed stock for causing a purer aluminum hydroxide to start precipitating from the solution, typically at one or more temperatures between about 60°–85° C. (140°–185° F.). After start-up, the high brightness level of this product can be maintained by recycling classified seed from the precipitation stream.

Figure 1B:
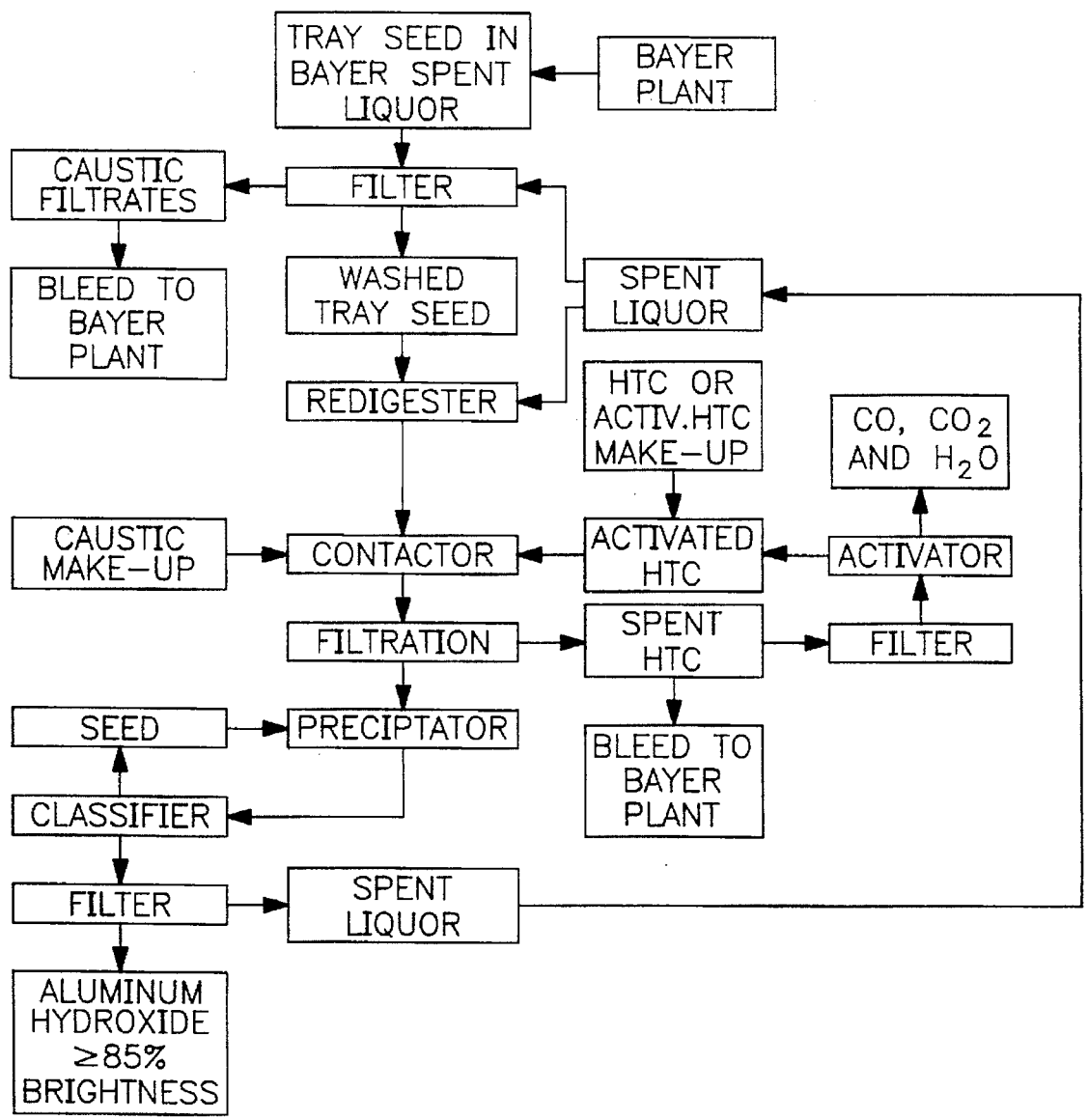
FIG. 1b is a flow chart of a second embodiment which filters redigested tray seed liquor after contact with activated hydrotalcite.

In a second embodiment, per FIG. 1b, color contaminant levels of an aluminate solution are lowered by pre-washing tray seed to remove Bayer liquor, therefrom. The tray seed is then redigested and the resultant sodium aluminate liquor contacted with the calcined form of an adsorbent having the formula $A_6B_2(OH)_{16}C.4H_2O$, wherein A is selected from the group consisting of: $Mg^{2+}$, $Ni^{2+}$, $Fe^{2+}$, $Ca^{2+}$ and $Zn^{2+}$; B from: $Al^{3+}$, $Fe^{3+}$ and $Cr^{3+}$; and C from: $OH^-$, $Cl^-$, $Br^-$, $NO_3^-$, $CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$ with $½ \leq z \leq 2$. Contacted or spent adsorbent is then separated from the solution to precipitate a whiter aluminum hydroxide product.

In preferred embodiments, powdered forms of calcined hydrotalcite are added directly to the caustic solution (or liquor) being treated. The amount of adsorbent to be added may be determined by testing representative samples so as to avoid underdosing or, more importantly, wasteful overdosing. With the added filtration step, or steps, of this invention, significantly lower dosages of activated hydrotalcite (as compared with the prior art will achieve higher whiteness levels than realized with prior known method. On a preferred basis, dosages of about 0.85 or 1.0 g/l or less have proven satisfactory with prefiltefing though lesser amounts of about 0.5 g/l, 0.2 g/l or even 0.1 g/l have also removed sufficient amounts of colorants/contaminants. While total contact times may vary from several minutes to one hour or more, current data shows that total treatment times of about 15 minutes or less accomplish sufficient colorant removal according to this embodiment of the present invention.

Figure 1C:
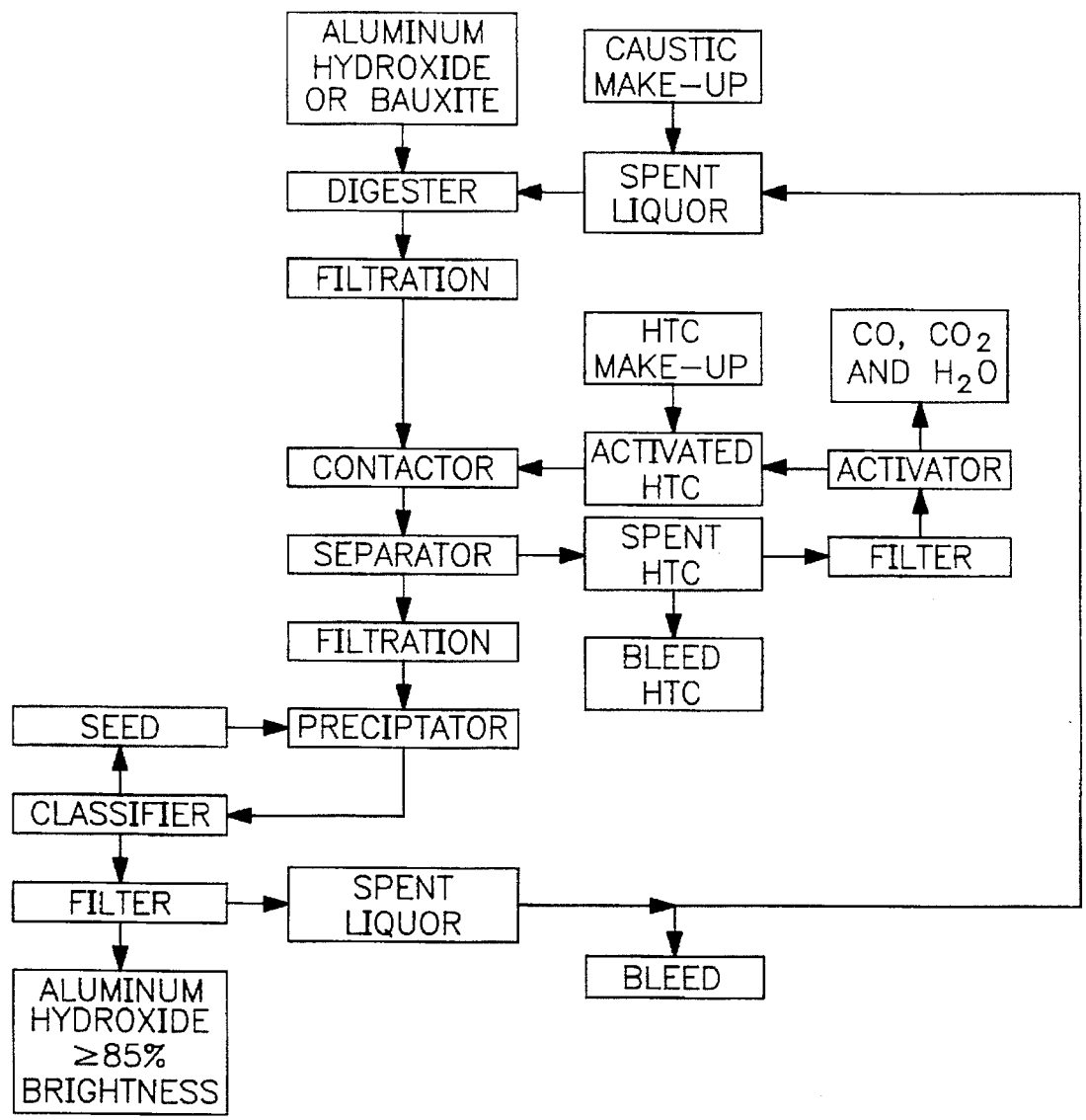
FIG. 1c is a flow chart depicting a third embodiment of this invention which filters a liquor stream both before and after contact with activated hydrotalcite adsorbent.

Saturated, spent, or contacted adsorbent is typically removed from caustic liquors by known or subsequently-developed techniques including filtration, using a primary separator, vacuum filter gravity settling and/or centrifugation. On a preferred basis, a pressure filter is used, most preferably, a continuous pressure filter apparatus. When activated hydrotalcite contact and settling is followed by another filtration step (per FIG. 1c), even greater levels of hydrate brightness may be achieved. Such post-contact filtering is believed to remove from solution most unactivated forms of hydrotalcite which may have formed during treatment together with any organics that are adsorbed or don't otherwise resolubilize.

When calcined hydrotalcite powders are combined with one or more binders before being extruded, foraged or otherwise shaped into large particle sizes, such particles can then be loaded into columns, fluidized beds or other containment means through which solution may be passed. A third contacting alternative exposes caustic solutions to a semi-solid sludge, or slurry, of calcined hydrotalcite. This treatment form is especially good at removing such representative contaminants as $NaFeO_2$, FeOOH, $Fe_2O_3$ and even certain humic acids.

Filtration only after solution contact with a substance consisting essentially of: calcined hydrotalcite, pyroaurite, takovite, or mixtures thereof will also result in an aluminum hydroxide of improved whiteness/brightness, though on a less preferred basis. The contacted adsorbent separated from this solution is preferably recalcined and recycled into a continuous or semi-continuous process for enhanced cost efficiencies.

The method of this invention is generally receptive to adsorbing electronegative or anionic colorants which are divalent, trivalent or higher in charge. Calcined hydrotalcite may also remove monovalent contaminants from solution though on a less preferred basis. Without being limited as to any particular theory of operation, it is believed that preferred embodiments proceed as follows. Upon calcination (or activation), both carbonate and water are expelled from hydrotalcite's basic structure according to the formula:

$$M_{g6}Al_2OH_{16}CO_3 \cdot 4H_2O \rightarrow M_{g6}Al_2O_8(OH)_2 + CO_2 + 11H_2O$$

Contact with an anionic or electronegative contaminant then causes said colorants to occupy vacated anion positions in the calcined product during solution contact and rehydration. For some contaminants, it is believed that a tricalcium aluminate intermediate forms upon hydrate redigestion. This intermediate then attracts hydrophobic, high molecular weight, organic colored molecules which are removed together through post-contact filtering practices.

EXAMPLES

For the atmospheric examples described below, a concentrated synthetic sodium aluminate liquor was prepared as follows: 536 grams of NaOH pellets were added with overhead stirring to 1484 grams of deionized water in a stainless steel beaker. Using a hot plate, the solution temperature was raised from 18° C. to 88° C. and the NaOH was allowed to dissolve. 724 grams of A-30 hydrate (65.0% brightness) was added to this solution and stirred. The combined solution was allowed to evaporate down before additional deionized water was added. This solution was then filtered for 45 minutes with #40 paper, measured for specific gravity and refrigerated. The target was 352 g/l Total Caustic (T/C) as $Na_2CO_3$, an alumina to caustic ratio of 0.667, 235 g/l of $Al_2O_3$ and a specific gravity of 1.372.

TABLE 1

INITIAL WHITENESS LEVELS

| | % Brightness | | |
|---|---|---|---|
| | % Brightness Readings | Average | Standard Dev. |
| Sample hydrate, as-received | 65.1 | 65.0 | 0.208 |
| | 64.8 | | |
| | 65.2 | | |
| C-30 seed material, as-received | 76.5 | 76.8 | 0.300 |
| | 76.8 | | |
| | 77.1 | | |
| Sample hydrate, once filtered | 83.9 | 83.5 | 0.566 |
| | 83.1 | | |
| Sample hydrate, treated w/4 g/l of Active HTC for min and filtered | 91.4 | 90.8 | 0.557 |
| | 90.7 | | |
| | 90.3 | | |
| C-31 seed material, as received | 96.7 | 96.6 | 0.058 |
| | 96.6 | | |
| | 96.7 | | |

The following control conditions were then maintained for many of the tests described below:

Seed: 50 g/l of C-30 hydrate (76.8% whiteness) screened to 200/325 mesh

Hydrotalcite: Laboratory activated at 550° C. for 80 minutes

Digested hydrate liquor temperature when treated with Activ. HTC: 95° C.

Synthetic Liquor: Total Caustic=175 g/l as $Na_2CO_3$; AC ratio=0.6; Spec. gravity=1.191

Precipitation conditions: 74° C. water bath for 24 hours

Using a liquor prepared under atmospheric conditions, the following matrix of tests was performed:

Test 1: Control Sample—No filtering and no Activ. HTC addition

Test 2: Only 1 Filtration Step performed

Test 3: Only treatment with Activ. HTC

Test 4: Treatment with Activ. HTC and Filtering thereafter

Test 5: Only 1 Filtration Step performed (as a repeat or check sample)

Test 6: Two Filtration Steps performed

Test 7: Prefiltering before Treatment with Activ. HTC; and

Test 8: Prefiltering, Treatment with Activ. HTC and Postfiltering

This matrix of tests resulted in the following % brightness and absorbance measurements:

TABLE 2

ATMOSPHERIC TESTS

| Test No. | Pre-filtered | 0.2 g/l of Activ. HTC for 15 min | Post-filtered | Hydrate Color by Absorbance | % Brightness |
|---|---|---|---|---|---|
| 1 | No | No | No | 0.101 | 82.7 |
| 2 | No | No | Yes | 0.129 | 91.8 |
| 3 | No | Yes | No | 0.072 | 84.6 |
| 4 | No | Yes | Yes | 0.175 | 93.5 |
| 5 | Yes | No | No | 0.123 | 92.3 |
| 6 | Yes | No | Yes | 0.109 | 92.8 |
| 7 | Yes | Yes | No | 0.161 | 91.4 |
| 8 | Yes | Yes | Yes | 0.128 | 94.0 |

Figure 2A:
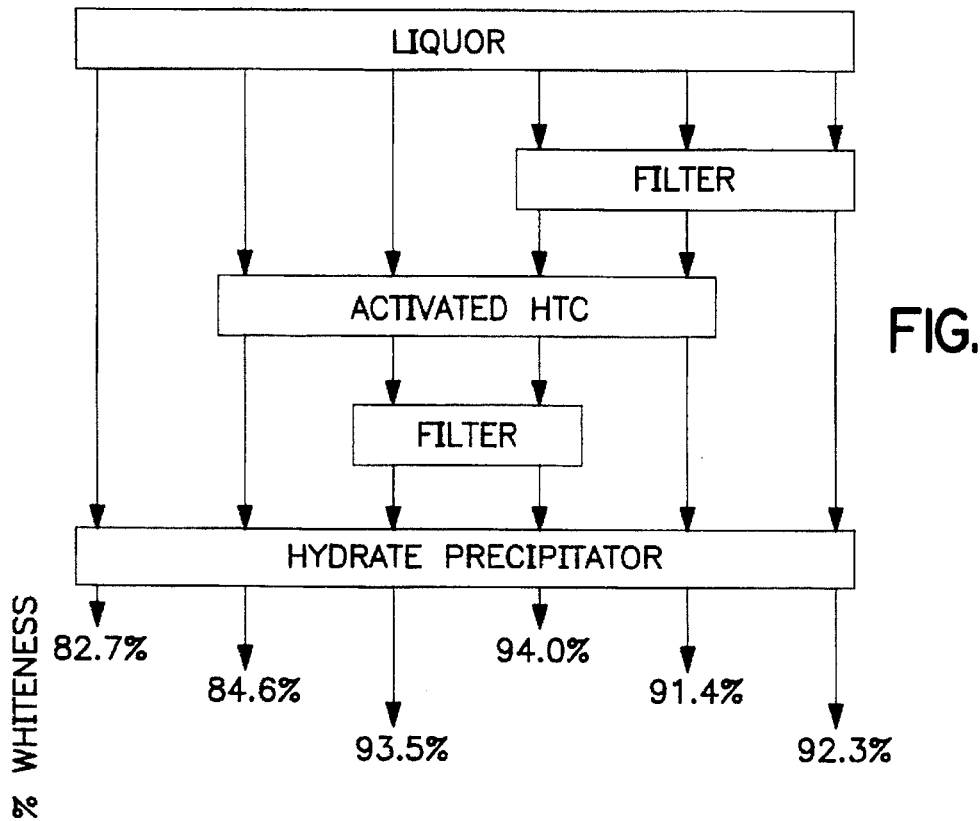
FIG. 2a is a flow chart which depicts the quantitative improvement in whiteness achieved when treating caustic liquors prepared at atmospheric pressure according to the invention.

These % brightness values are summarized graphically at FIG. 2a.

Figure 2B:
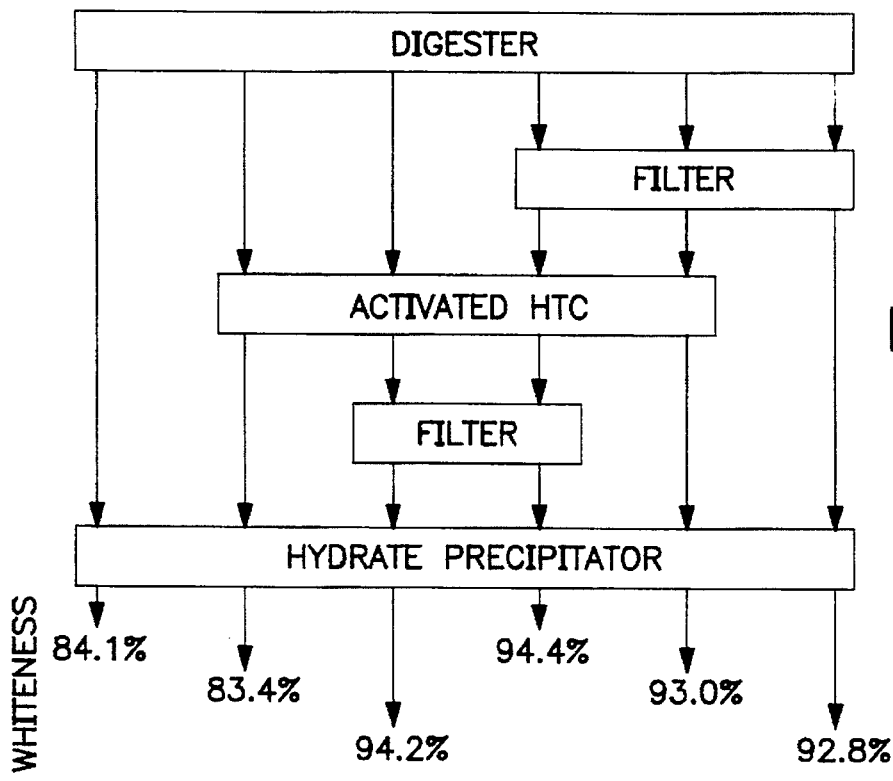
FIG. 2b is a flow chart depicting the quantitative improvement in whiteness achieved when such liquors have been subjected to a simulated pressure (or "bomb") digestion.

A second matrix of tests was performed on a caustic solution that was bomb digested in a Parr reactor at 143° C. for 30 minutes in order to rapidly and completely redissolve alumina in caustic and simulate plant digester conditions which may chemically change some of the organic colorants present. This resulted in the following absorbance and % brightness levels, the latter of which are graphically summarized at FIG. 2b.

TABLE 3

BOMB DIGESTED

| Test No. | Pre-filtered | 0.2 g/l of Activ. HTC for 15 min | Post-filtered | Hydrate Color by Absorbance | % Brightness |
|---|---|---|---|---|---|
| 1 | No | No | No | 0.062 | 84.1 |
| 2 | No | No | Yes | 0.130 | 93.3 |
| 3 | No | Yes | No | 0.054 | 83.4 |
| 4 | No | Yes | Yes | 0.061 | 94.2 |
| 5 | Yes | No | No | 0.120 | 92.8 |
| 6 | Yes | No | Yes | 0.068 | 94.2 |
| 7 | Yes | Yes | No | 0.047 | 93.0 |
| 8 | Yes | Yes | Yes | 0.039 | 94.4 |

Figure 3:
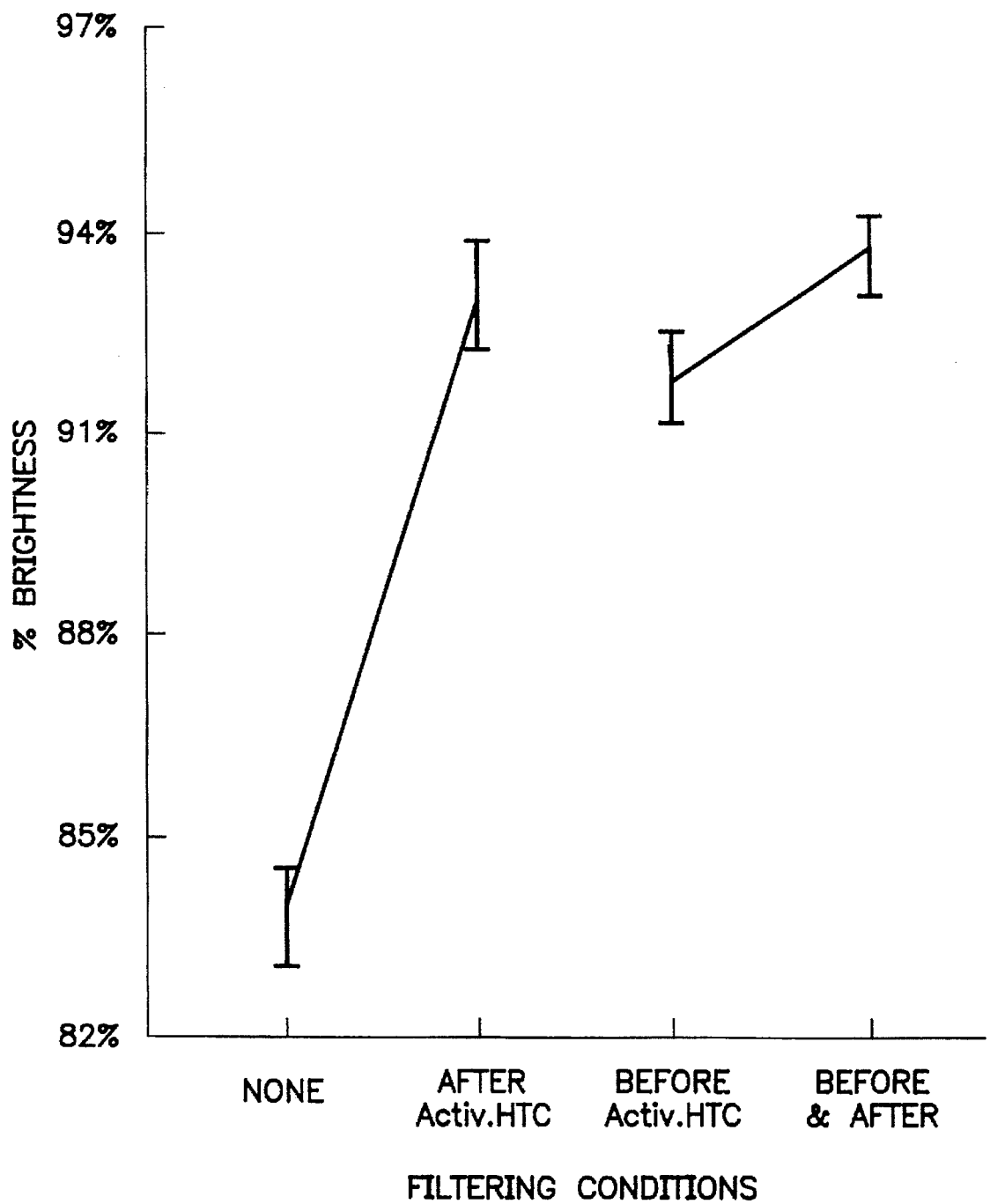
FIG. 3 is a graph comparing the average brightness levels achieved (y-axis) under various filtering conditions (x-axis).

The overall effect on % whiteness improvement by combining filtering steps with activated hydrotalcite contact is shown at FIG. 3.

A series of tests were then performed using various adsorbent exposure times and dosages (with both pre- and -post filtering) resulting in the following brightness data:

TABLE 4

DOSAGES & TREATMENT TIMES

| Run # | Dose of Activ. HTC (g/l) | Treatment Time (min.) | % Brightness |
|---|---|---|---|
| 1 | 0 | 0 | 85.0 |
| 2 | 0.1 | 7.5 | 88.9 |
| 3 | 0.1 | 15 | 89.2 |
| 4 | 0.2 | 7.5 | 88.3 |
| 5 | 0.2 | 15 | 87.0 |
| 6 | 0.2 | 30 | 88.5 |
| 7 | 0.33 | 15 | 88.1 |
| 8(a) | 0.33 | 30 | 90.8 |
| 8(b) | 0.33 | 30 | 90.2 |
| 9 | 0.33 | 60 | 88.1 |
| 10 | 1.0 | 30 | 89.4 |
| 11 | 1.0 | 60 | 89.5 |
| 12 | 2.5 | 30 | 90.2 |
| 13 | 2.5 | 60 | 89.3 |
| 14 | 5.0 | 30 | 92.7 |
| 15 | 5.0 | 60 | 89.2 |

A series of tests was also run to determine the recyclability of activated hydrotalcite in this method. Each cycle of a four cycle test used a fresh supply of redigested hydrate liquor. Synthetic caustic liquor was exposed for 15 minutes to 0.33 g/l of adsorbent for the first cycle and to the cumulative filtered solids described below (which included reactivated hydrotalcite in the second through fourth cycles). Contacted solids were filtered off, dried overnight and reactivated at 550° C. for 80 minutes. In the second through fourth cycles, both C-30 and C-31 hydrates were used as seed material for comparative purposes.

TABLE 5

RECYCLING ACTIV. HTC

| | C-30 Seed* | C-31 Seed* | Added Charge of Activ. HTC & other additives (g/l) |
|---|---|---|---|
| Starting Hydrate | 0.466 | — | — |
| Reprecipitated | 0.171 | — | — |
| Cycle 1 | 0.135 | — | 0.33 |
| Cycle 2 | 0.144 | 0.024 | 0.47 |
| Cycle 3 | 0.141 | 0.026 | 0.75 |
| Cycle 4 | 0.147 | 0.040 | 0.79 |

*The absorbance and brightness of these starting seed samples were 0.346 and 76.8% for C-30 and 0.007 and 96.6% for C-31.

From the foregoing data, the thermal regeneration and reuse of activated hydrotalcite over 4 cycles resulted in less than a 10% decline in overall color removal effectiveness.

Having described the presently preferred embodiments, it is to be understood that the invention may be otherwise embodied within the scope of the appended claims.

What is claimed is:

1. A method for removing contaminants from a caustic aluminate solution to produce an aluminum hydroxide of improved brightness, said method comprising the steps of:
   (a) filtering the solution by passing it through a primary separation apparatus selected from the group consisting of a pressure filter, a vacuum filter, a gravity settler and a centrifuge, to remove at least some solid contaminants therefrom; and
   (b) contacting the solution with less than about 1.0 g/l of an adsorbent comprising a calcined compound having the formula $A_wB_x(OH)_yC_z \cdot nH_2O$ wherein A represents a divalent metal cation selected from the group consisting of: $Mg^{2+}$, $Ni^{2+}$, $Fe^{2+}$, $Ca^{2+}$, and $Zn^{2+}$; B represents a trivalent metal cation selected from the group consisting of: $Al^{3+}$, $Fe^{3+}$ and $Cu^{3+}$; C represents a mono- to tetravalent anion selected from the group consisting of: $OH^-$, $Cl^-$, $Br^-$, $NO_3^{31}$ $CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$; and w, x, y, z and n satisfy the following: $0 < z \leq x \leq 4 \leq w \leq \frac{1}{2}$ y and $12 \geq n \geq \frac{1}{2}$ (w−x); and
   (c) adsorbing more of the solid contaminants from the solution onto the calcined compound; and
   (d) precipitating from the solution an aluminum hydroxide of improved brightness.

2. The method of claim 1 which further includes:
   prior to step (d), filtering the solution to remove contacted adsorbent and more of the solid contaminants from the solution.

3. The method of claim 1 which further includes:
   prior to step (d), adding to the solution as seed material an aluminum hydroxide of high brightness, thereby to precipitate from the solution an aluminum hydroxide having a whiteness level of 85% or higher based on a 100% $TiO_2$ reference standard.

4. The method of claim 1 which includes contacting the solution with about 0.3 g/l or less of an activated hydrotalcite.

5. The method of claim 1 wherein the solution contains solutes selected from the group consisting of: sodium hydroxide, sodium carbonate, sodium aluminate and mixtures thereof.

6. The method of claim 1 which further includes:
   (i) separating calcined compound from the solution;
   (ii) recalcining the separated compound; and
   (iii) contacting the recalcined compound with more of the solution.

7. A method for improving the brightness level of aluminum hydroxide removed from a solution of sodium aluminate, said method comprising the steps of:
   (a) contacting the solution with less than about 1.0 g/l of an adsorbent consisting essentially of a calcined compound having the formula $A_6B_2(OH)_{16}C_z \cdot 4H_2O$ wherein A is selected from the group consisting of: $Mg^{2+}$, $Ni^{2+}$, $Fe^{2+}$, $Ca^{2+}$ and $Zn^{2+}$; B is selected from the group consisting of: $Al^{3+}$, $Fe^{3+}$ and $Cu^{3+}$; C is selected from the group consisting of: $OH^-$, $Cl^-$, $Br^-$, $NO_3^-$ $CH_3COO^-$, $C_2O_4^{2+}$, $CO_3^{2+}$, $SO_4^{2+}$, $PO_4^{3+}$, $Fe(CN)_6^{3+}$ and $Fe(CN)_6^{4+}$; and $\frac{1}{2} \leq z \leq 2$; and
   (b) filtering the solution by passing it through a primary separator selected from the group consisting of a pressure filter, a vacuum filter, a gravity settler and a centrifuge to remove contacted calcined compound and contaminants therefrom; and
   (c) removing from the solution an aluminum hydroxide having an improved brightness level.

8. The method of claim 7 which further includes: filtering the solution prior to step (a).

9. The method of claim 7 which further includes:
   (c) adding to the solution as seed material an aluminum hydroxide with a whiteness level of about 85% or higher based on a 100% $TiO_2$ reference standard.

10. The method of claim 9 which further includes:
    (d) separating calcined compound from the solution;
    (e) recalcining the separated compound; and
    (f) recycling the recalcined compound into more of the solution.

11. The method of claim 7 wherein step (a) comprises: contacting the solution with about 0.3 g/l or less of an activated hydrotalcite.

12. A method for making aluminum hydroxide of improved whiteness from a caustic aluminate solution, said aluminum hydroxide having a whiteness level of about 85% or higher based on a 100% $TiO_2$ reference standard, said method comprising the steps of:
- (a) contacting the solution with less than about 1.0 g/l of an adsorbent consisting essentially of a calcined compound selected from the group consisting of: hydrotalcite, pyroaurite, takovite and mixtures thereof; and
- (b) filtering the solution by passing it through a primary separator selected from the group consisting of a pressure filter, a vacuum filter, a gravity settler and a centrifuge to remove color contaminants therefrom, said filtering being performed: (i) prior to step (a); (ii) after step (a); or (iii) both before and after step (a); and
- (c) precipitating an aluminum hydroxide of improved whiteness from the solution.

13. The method of claim 12 which further includes:
- (c) adding to the solution as seed material an aluminum hydroxide with a whiteness level of about 85% or higher based on a 100% $TiO_2$ reference standard.

14. The method of claim 12 which further includes:
- (d) recycling calcined compound into more of the solution.

15. The method of claim 12 wherein step (a) comprises contacting the solution with about 0.3 g/l or less of an activated hydrotalcite.

16. In a method for treating a caustic solution to remove colorants therefrom, said method including the step of contacting the solution with a calcined compound having the formula $A_wB_x(OH)_yC_z \cdot nH_2O$ wherein A represents a divalent metal cation selected from the group consisting of: $Mg^{2+}$, $Ni^{2+}$, $Fe^{2+}$, $Ca^{2+}$ and $Zn^{2+}$; B represents a trivalent metal cation selected from the group consisting of: $Al^{3+}$, $Fe^{3+}$ and $Cu^{3+}$; C represents a mono- to tetravalent anion selected from the group consisting of: $OH^-$, $Cl^-$, $Br^-$, $NO_3^- CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$; and w, x, y, z and n satisfy the following: $0 < z \leq x \leq 4 \leq w \leq \frac{1}{2} y$ and $12 \geq n \geq \frac{1}{2}(w-x)$, the improvement which comprises contacting the solution with less than about 1.0 g/l of the calcined compound and filtering the solution by passing it through a primary separation apparatus selected from the group consisting of a pressure filter, a vacuum filter, a gravity settler and a centrifuge to remove small contaminants therefrom, said filtering being performed either (i) prior to said contacting step; (ii) after said contacting step; or (iii) both before and after said contacting step.

17. The improvement of claim 16 which further includes adding to the solution as seed material an aluminum hydroxide with a whiteness level of 85% or higher based on a 100% $TiO_2$ reference standard.

18. The improvement of claim 16 which further includes:
- (a) separating calcined compound from the solution;
- (b) recalcining the separated compound; and
- (c) contacting recalcined compound with more of the solution.

19. A method for removing contaminants from a caustic aluminate solution so that an aluminum hydroxide precipitated therefrom will have improved brightness, said method comprising the steps of:
- (a) pressure filtering the solution to remove at least some solid contaminants therefrom; and
- (b) contacting the solution with about 0.85 g/l or less of an adsorbent comprising a calcined compound having the formula $A_wB_x(OH)_yC_z \cdot nH_2O$ wherein A represents a divalent metal cation selected from the group consisting of: $Mg^{2+}$, $Ni^{2+}$, $Fe^{2+}$, $Ca^{2+}$ and $Zn^{2+}$; B represents a trivalent metal cation selected from the group consisting of: $Al^{3+}$, $Fe^{3+}$ and $Cu^{3+}$; C represents a mono- to tetravalent anion selected from the group consisting of: $OH^-$, $Cl^-$, $Br^-$, $NO_3^- CH_3COO^-$, $C_2O_4^{2-}$, $CO_3^{2-}$, $SO_4^{2-}$, $PO_4^{3-}$, $Fe(CN)_6^{3-}$ and $Fe(CN)_6^{4-}$; and w, x, y, z and n satisfy the following: $0 < z \leq x \leq 4 \leq w \leq \frac{1}{2} y$ and $12 \geq n \geq \frac{1}{2}(w-x)$; and
- (c) adsorbing more of the solid contaminants from the solution onto the calcined compound.

20. The method of claim 19 which further includes:
- (d) pressure filtering the solution to remove contacted adsorbent and more of the solid contaminants from the solution.

21. The method of claim 20 which further includes:
- (e) adding to the solution as seed material an aluminum hydroxide of high brightness, thereby to precipitate from the solution an aluminum hydroxide having a whiteness level of 85% or higher based on a 100% $TiO_2$ reference standard.

22. The method of claim 20 wherein step (a), step (d) or both steps (a) and (d) are performed by passing the solution through a continuous pressure filter apparatus.

23. The method of claim 19 which includes contacting the solution with about 0.3 g/l or less of an activated hydrotalcite.

24. The method of claim 19 which further includes:
- (i) separating calcined compound from the solution;
- (ii) recalcining the separated compound; and
- (iii) contacting the recalcined compound with more of the solution.

25. A method for making aluminum hydroxide having a whiteness level of about 85% or higher based on a 100% $TiO_2$ reference standard from a caustic aluminate solution, said method comprising the steps of:
- (a) contacting the solution with about 0.85 g/l or less of an adsorbent consisting essentially of a calcined compound selected from the group consisting of: hydrotalcite, pyroaurite, takovite and mixtures thereof; and
- (b) pressure filtering the solution to remove color contaminants therefrom, said filtering being performed: (i) prior to step (a); (ii) after step (a); or (iii) both before and after step (a); and
- (c) precipitating from the solution an aluminum hydroxide having a whiteness level of about 85% or higher based on a 100% $TiO_2$ reference standard.

26. The method of claim 25 which further includes:
prior to step (c), adding to the solution as seed material an aluminum hydroxide with a whiteness level of about 85% or higher based on a 100% $TiO_2$ reference standard.

27. The method of claim 25 which further includes:
- (d) recycling calcined compound into more of the solution.

28. The method of claim 25 wherein step (b) is performed by passing the solution through a continuous pressure filter apparatus.

* * * * *

UNITED STATES PATENT AND TRADEMARK OFFICE
CERTIFICATE OF CORRECTION

PATENT NO.   : 5,624,646
DATED        : April 29, 1997
INVENTOR(S)  : Richard B. Phillips et al.

It is certified that error appears in the above-identified patent and that said Letters Patent is hereby corrected as shown below:

Col. 10, line 7, Claim 1

Before $CH_3COO^-$, delete "$NO_3^{31}$", and insert -- $NO_3^-$ --.

Col. 10, lines 47 and 48, Claim 7

After $CH_3COO^-$, delete $C_2O_4^{2+}$, $SO_4^{2+}$, $PO_4^{3+}$, $Fe(CN)_6^{3+}$ and $Fe(CN)_6^{4+}$ and insert therefor -- $C_2O_4^{2-}$, $CO_3^{2-}$, $SO_4^{2-}$, $PO_4^{3-}$, $Fe(CN)_6^{3-}$ and $Fe(CN)_6^{4-}$;

Signed and Sealed this

Twenty-eighth Day of April, 1998

Attest:

*Bruce Lehman*

BRUCE LEHMAN

*Attesting Officer*       Commissioner of Patents and Trademarks